Patented Mar. 1, 1932

1,847,356

UNITED STATES PATENT OFFICE

ROBERT T. NORTHCUTT, OF CRANFORD, NEW JERSEY, ASSIGNOR, BY DIRECT AND MESNE ASSIGNMENTS, TO GENERAL PACKING CORPORATION, OF CRANFORD, NEW JERSEY, A CORPORATION OF VIRGINIA

ARTICLE OF MANUFACTURE AND METHOD OF PREPARING A SYRUP CARRYING PECTIN IN SUSPENSION

No Drawing.    Application filed October 10, 1925.    Serial No. 61,840.

My new article of manufacture consists of a concentrated liquid, such for instance as a fruit syrup carrying a pectin, and carbohydrate, such for instance as sugar, and an acid, such for instance as malic acid, the various bodies in such amounts that the pectin will not enter into solution with the other bodies to form a jell, but will do so when the concentrated liquid is diluted with water to the required amount and a further amount of carbohydrate added, with or without being subjected to the action of heat.

The object of my invention is to provide a concentrated liquid containing the bodies specified, and which is small in bulk, and which may be stored for any length of time, and which, when desired for use may be rendered active to form a jell by the further addition of water and a carbohydrate; thus eight ounces of a concentrated fruit syrup, such for instance as is derived from grapes, will carry in suspension, but not in solution, sufficient pectin to convert this concentrated fruit syrup, upon the addition of sugar, into sixty-four ounces of fruit syrup which will jell to form a similar amount of grape jelly.

The method of production of the concentrated fruit syrup is substantially as follows: The fruit to form the basis of the concentrated syrup is first selected and then introduced into water and concentrated to form a syrup of about 30° Baumé density. During the concentration or after it, the concentrated solution is acidulated with an acid such for instance as tartaric acid, citric acid, malic acid or any mixture of such acids. The amount of acid added will depend first upon the character of the concentrated syrup, the amount of sugar present, etc.
The object sought to be obtained is to produce a syrup which will hold the required amount of pectin in suspension, but not in solution. For example, having decided upon a certain volume of goods to be treated, for instance, eight ounces and the number of times it is to be diluted, say four times with water and four times with sugar, a total of eight times, there is then weighed out and introduced sufficient powdered pectin to produce sixty-four ounces of jelly. The amount of pectin to be introduced is variable, as the pectin found in the market is not standardized. It may be assumed, however, as an illustration, that the pectin required will be seven-tenths of an ounce. The seven-tenths of the ounce is then introduced into the concentrated syrup. Before doing this, however, it is preferable to test the concentrated syrup to determine the amount of pectin which may be introduced, that is, to determine whether the pectin will be soluble in the concentrated syrup or will be carried in suspension. This may be quickly determined by first heating the concentrated syrup to the usual jellying point, i. e., approximately 217° F. or over. If the concentrated syrup is thick at such test or in other words, shows a tendency to jell, the acidity of the concentrated syrup is increased until the pectin is found to remain in suspension. The percentage of acid which may be used ranges between one-half and four per cent.

The standardized concentrated fruit syrup is then ready for bottling. To use this syrup water is added.

The amount of water may vary from three to four times the bulk of the concentrated fruit syrup. Sugar is then introduced; the amount may vary from three to four times the amount of the sugar in the concentrated syrup. It should be borne in mind that owing to the great diversity of fruits which may be used as a basis for the concentrated fruit syrup, the amount of sugar, the acids and other bodies, it is practically impossible to give specific instructions as to the amount of acid and pectin which may be added. The general condition to be observed is, however, as before stated, that the concentrated fruit syrup will only contain such a proportion of sugar and acid as will maintain the introduced pectin in suspension in the syrup, and not in solution, and further, that when the concentrated fruit syrup is used, that the amount of water and sugar added will be such as to cause the introduced pectin to go into solution. All of these facts can be readily determined by well known means, as for instance, by tests in a test tube. It will be understood that the fruit juice employed acts as a flavoring means. Manifestly, any syrup, however flavored, may be employed to form my article of manufacture which may, when required, be converted, by the addition of water and a further amount of carbohydrate, into a jelly.

Having thus described my invention I claim:

1. A new article of manufacture consisting of a concentrated fruit syrup carrying pectin in suspension, but not in solution therein.

2. As a new article of manufacture, a concentrated fruit syrup carrying sugar and an acid and pectin, the relation between the sugar, the acid and the pectin being such that the pectin introduced is in suspension but not in solution.

3. The method of forming a concentrated fruit syrup containing pectin in suspension which consists in forming a concentrated fruit syrup, determining the percentage of the carbohydrate carried by the syrup and the percentage of acidity, then regulating the amount of the carbohydrate and acidity until a point is reached where the pectin introduced is in suspension, but not in solution.

4. The method of forming a concentrated fruit syrup carrying pectin in suspension, which consists in first concentrating a fruit to a syrup, then introducing an acid in such amount that the relation between the carbohydrate present and the acid added shall be such that the subsequently added pectin is in suspension, but not in solution.

In testimony whereof I affix my signature.

ROBERT T. NORTHCUTT.